United States Patent [19]
Haase et al.

[11] Patent Number: 5,305,983
[45] Date of Patent: Apr. 26, 1994

[54] SPINNING DEVICE

[75] Inventors: Manfred Haase; Gottfried Schneider, both of Ingolstadt, Fed. Rep. of Germany

[73] Assignee: Rieter Ingolstadt Spinnereimaschinenbau AG, Ingolstadt, Fed. Rep. of Germany

[21] Appl. No.: 111,109

[22] Filed: Aug. 24, 1993

Related U.S. Application Data

[63] Continuation of Ser. No. 923,300, Jul. 31, 1992, abandoned.

[30] Foreign Application Priority Data

Aug. 8, 1991 [DE] Fed. Rep. of Germany ....... 4126282

[51] Int. Cl.$^5$ ............................................. F16K 7/00
[52] U.S. Cl. ........................................... 251/5; 251/29
[58] Field of Search ........................ 251/5, 29, 30.05

[56] References Cited

U.S. PATENT DOCUMENTS

| | | | |
|---|---|---|---|
| 2,786,642 | 3/1957 | Long | 251/30.05 |
| 3,145,967 | 8/1964 | Gardner | 251/30.05 X |
| 3,936,028 | 2/1976 | Norton et al. | 251/5 |
| 3,984,080 | 10/1976 | Varis et al. | 251/5 |
| 4,442,954 | 4/1984 | Bergandy | 251/5 X |
| 4,642,833 | 2/1987 | Stoltz et al. | 251/5 X |
| 4,893,462 | 1/1990 | Braun et al. | |

FOREIGN PATENT DOCUMENTS

| | | |
|---|---|---|
| 3102363C2 | 11/1983 | Fed. Rep. of Germany . |
| 3617522C1 | 7/1987 | Fed. Rep. of Germany . |
| 3726531 | 12/1988 | Fed. Rep. of Germany . |
| 3827580A1 | 4/1989 | Fed. Rep. of Germany . |
| 9002829.5 | 7/1990 | Fed. Rep. of Germany . |

*Primary Examiner*—John C. Fox
*Attorney, Agent, or Firm*—Dority & Manning

[57] ABSTRACT

The instant invention relates to a spinning device, in particular a spinning or winding device. The device comprises a pressure circuit with a valve installed therein to control the pressure. The valve can be actuated pneumatically. A device for rapid aeration of the valve is provided with the valve. The valve is actuated by compressed air acting upon a side of a cup seal away from a pressure chamber, causing the cup seal to close off an aeration opening. The compressed air streams past the cup seal and fills the pressure chamber, whereby a passage cross-section of the valve is reduced or closed off by means of a closing element acting upon the pressure in the pressure chamber in opposition to a restoring force. As the pressure on the side of the cup seal away from the pressure chamber is reduced, the pressure on the side of the cup seal towards the pressure chamber is increased. As a result the cup seal moves in direction of lower pressure and the aeration opening is again opened. The closing element returns in this manner rapidly into its original position under the effect of its restoring force.

11 Claims, 2 Drawing Sheets

SPINNING DEVICE

This is a continuation of application Ser. No. 07/923,300 filed Jul. 31, 1992, which was abandoned upon the filing hereof.

BACKGROUND OF THE INVENTION

The instant invention relates to a spinning device, in particular a spinning or winding device with a pressure circuit and with a valve in the pressure circuit to control the pressure.

The connection of a spinning rotor connected via a suction circuit to a negative pressure circuit and the installation of a valve in the suction circuit to release and shut off the negative spinning pressure is known from DE 37 26 531 C1. The valve is made in form of a hose diaphragm valve. The negative spinning pressure is released and shut off by means of a clamping lever which can be swivelled transversely to the valve. In this manner the hose diaphragm is pressed against the wall of the valve by a clamping end. By shutting off the negative spinning pressure and switching on aspiration at the fiber sliver opener roller, the fibers loosened from the fiber sliver do not reach the spinning rotor but the aspiration opening. By again opening the valve and terminating suction, the fibers again enter the spinning rotor. This deflection of the fiber stream is used during the yarn piecing process in order to achieve uniform yarn piecing joints. The opening characteristic of the valve is a disadvantage in the known device. The valve opens relatively slowly due to the inertia of the components to be moved. Because of the negative spinning pressure increases gradually, only gradual availability of the maximum fiber stream is possible. Because of the mechanical components, a uniform opening time over several opening cycles and at different spinning devices is not always ensured. Furthermore much space is required to control the valve via the lever.

OBJECTS AND SUMMARY OF THE INVENTION

It is therefore a principle object of the instant invention to create a spinning device with a valve to open and close a compressed-air circuit which in particular carries out the opening process at a uniformly rapid speed and with little time tolerance.

This object is attained by the invention in that the valve can be operated pneumatically and in that a device for rapid aeration of the valve is provided on the valve. Pneumatic valves have the advantage over mechanical valves that they are less influenced by friction as is the case with levers and linkages of mechanical valves. However, when long air circuits are used with pneumatic valves, switching at precise points in time is no longer ensured. In order to obtain precise opening times of the valve a rapid-aeration device is installed on the valve according to the instant invention, so that relatively small amounts of air can be taken rapidly from the valve through large openings. Because of the short distances to be covered by the air when the valve is opened or when it is aerated, a great number of opening processes with little time differences among them can be carried out very rapidly with great ease. In spinning devices, in particular in spinning and winding devices, it is often important to set the beginning and end of an overpressure or negative pressure air stream at precise points in time. Such air streams are used to control fiber and/or dust flow or the movement of yarns.

A precise opening time is especially important for the valve. If only little space is available to install the valve it is advantageous to install the device for the actuation of the valve and the device for rapid aeration of the valve at separate locations. The device for the actuation of the valve can then be installed at a location where sufficient space is available. It is furthermore possible to provide only one device for the actuation of the valve for several spinning devices equipped with such a valve. In that case the device for the actuation of the valve is assigned to a specific valve only when actuation is imminent.

If an aeration opening is provided directly on the valve, the air mass to be conveyed for aeration is very small. Also the distances which the air must cover in aeration are very short. By providing large aeration openings the valve is aerated rapidly. This ensures very rapid opening of the valve.

In an advantageous further embodiment the aeration opening is closed automatically when the valve is supplied with compressed air. Thereby additional construction outlay for the opening and closing of the aeration opening is avoided. The control of the closing of the aeration opening is advantageously effected through a cup seal which is provided at the same time to close a pressure circuit through which pressure is supplied to the valve for actuation.

In an advantageous embodiment the valve is a diaphragm valve. A diaphragm valve has the advantage that it can be controlled without any great construction outlay. If the diaphragm valve is a hose crimping valve in which the diaphragm is an elastic hose, this has the advantage that on the one hand large passage cross-sections through the valve are possible, and on the other hand also very rapid closing and opening times can be achieved.

If the hose diaphragm is installed between sealing clamping points, an increased restoring force for its return to its original form after an extension is ensured, by contrast with a non-stretched hose. A pressure chamber in the valve surrounding the hose diaphragm, the entire periphery of the hose diaphragm is subjected to pressure. This again ensures a rapid reaction time of the valve.

The hose diaphragm is advantageously elastic so that the hose diaphragm seals off the pressure circuit tightly as pressure in the pressure chamber increases. In order to achieve this, the inside of the hose diaphragm must be capable of being pressed together tightly by the pressure prevailing in the pressure chamber. On the other hand the hose diaphragm must also possess an elasticity ensuring that said hose diaphragm will return rapidly into its original position when pressure is reduced in the surrounding pressure chamber so that the maximum passage opening will again be available in the valve. These requirements of elasticity of the hose diaphragm also apply to any other configuration of the diaphragm of the diaphragm valve.

Such valves are especially advantageous when negative pressure prevails in the pressure circuit. On the one hand tight sealing is ensured by such a valve in such case, since the negative pressure assists the diaphragm in closing. On the other hand the prevailing negative pressure does not assist the aeration of the valve but rather inhibits it. The provision of rapid aeration of the valve according to the instant invention facilitates aeration when negative pressure is carried in the pressure circuit.

A solenoid valve is advantageously provided between the source of overpressure and the valve for the pneumatic actuation of said valve. It is however also possible to actuate the valve by mechanical or pneumatic means. However this requires a greater construction outlay.

The valve is advantageously actuated in that compressed air acts upon the side of the cup seal away from the pressure chamber. As a result the cup seal is pressed against an aeration opening and seals it tightly. The compressed air flows past the cup seal and fills the pressure chamber. Increased pressure in the pressure chamber causes a closing element to be moved contrary to a restoring force and to reduce the passage cross-section of the valve until it is completely closed. If the pressure applied to actuate the valve is reduced, an imbalance acting upon the cup seal is produced causing the latter to move in direction of the lower pressure so that the aeration opening is opened. The now opened aeration opening causes the pressure acting upon the closing element to be reduced instantly so that the closing element is able to return very rapidly into its original position under its restoring force. In this manner the maximum passage cross-section of the valve is again restored. The instant opening of the aeration creates a large aeration cross-section, independently of the cross-section of the compress-air supply duct from a source of compressed air to the valve, so that the valve very quickly reaches ambient pressure.

The increase and reduction of the pressure of the compressed air is advantageously controlled by a solenoid valve which may react to signals of a service unit, for example.

If the closing element is a hose diaphragm, the valve is closed by a fold forming in this hose diaphragm. Depending on the elasticity at the periphery of the hose diaphragm it can be determined how many folds of the hose diaphragm should be formed as it is actuated. It has been shown to be advantageous for the hose diaphragm to have uniform wall thickness and elasticity over its periphery, so two folds are formed. In this manner rapid reaction and a tight seal is ensured.

The valve can be used advantageously in an open-end spinning machine in piecing a yarn. In that case suction applied to the spinning rotor is interrupted before piecing by closing the negative pressure circuit by means of the valve. For piecing, a yarn end is introduced into the rotor. The suction applied to the rotor is resumed in synchronization with the introduction of the yarn end into the rotor. If the housing of the opener roller on the spinning device is provided with a suction opening for the removal of fibers during the preparation of the piecing process, the beginning of suction applied to the rotor is advantageously synchronized with the end of suction through the suction opening in the housing of the opener roller. If the suction opening is located between fiber feeding channel and feeding device, suction applied to the rotor is advantageously released together with or before the interruption of suction through the suction opening in the housing of the opener roller. As a result, lap formations on the opener roller by non-removed fibers is prevented.

The invention is described below in greater detail through the description of the preferred embodiments.

DETAILED DESCRIPTION OF THE PREFERRED EMBODIMENTS

Figure 1:
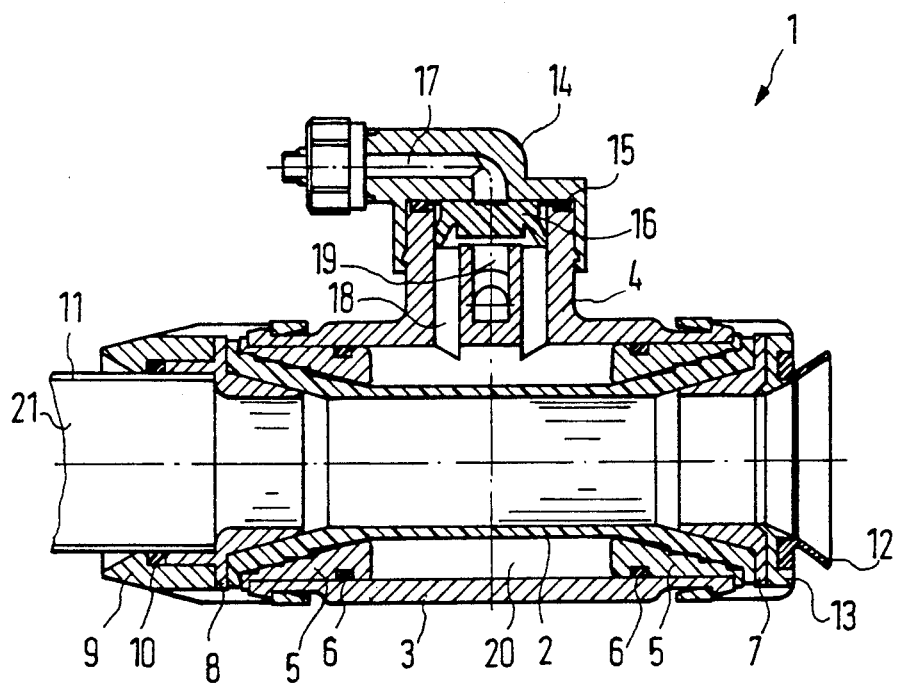
FIG. 1 is a perspective cross-sectional view of the present invention.

FIG. 1 shows a valve with a pressure pipe 3 and a rapid-aeration device 4 in a longitudinal cross-section. A hose diaphragm 2 is located in the pressure pipe 3. It is clamped between a cone ring 5 and a support ring 7,8. The hose diaphragm 2 is mounted in a prestressed condition between the holding points. Prestressing the hose diaphragm 2 ensures rapid and uniform resetting of said hose diaphragm 2 as the valve 1 opens in its shown normal position. The cone ring 5, the hose diaphragm 2 and the support ring 7,8 are pressed upon each other by means of end pieces 9, 13. The clamping of the hose diaphragm 2 between the cone rings 5 and the support rings 7,8, together with O-rings 6 located between the cone rings 5 and the pressure pipe 3, seals off a pressure chamber 20 from the outside and from a pressure circuit 21.

The valve 1 shown is a negative pressure valve, i.e. negative pressure prevails in the pressure circuit 21. In the pressure chamber 20 on the other hand, overpressure prevails when valve 1 is actuated, causing the hose diaphragm 2 to be compressed and the negative pressure to be closed off in the pressure circuit 21. Because of the overpressure in the pressure chamber 20 the configuration of the surface between cone ring 5 and hose diaphragm 2 must meet special requirements so that the pressure chamber 20 may be sealed off tightly against the outside. For this purpose the surfaces in contact with each other are stepped, thus ensuring secure sealing.

Support ring 8 and end piece 9 are designed so as to create a strong connection between the valve 1 and a pressure hose 11. For this purpose the pressure hose 11 is inserted into the end piece 9 and the support ring 8. A seal of the pressure circuit 21 against the outside is ensured through an O-ring 10 which is placed between the pressure hose 11 and the end piece 9. The configuration of the support ring 7 and of the end piece 13 and a seal lip 12 is such as to create a loose connection in order to connect the valve to a chamber to be subjected to suction. Such a connection is advantageous if the valve and the chamber to be subjected to suction must often be separated, e.g. for maintenance.

The rapid-aeration device 4 is provided directly on the pressure pipe 3. This advantageously ensures that minimum amounts of air must be moved when the pressure chamber 20 is aerated and provides the conditions for an uniformly rapid opening of the valves over a plurality of opening processes. The rapid-aeration device 4 is closed by means of a cover 14 and an O-ring 15 in order to seal it. A pressure circuit 17 is located in the cover 14. In the rapid-aeration device 4 a pressure channel 18 and an aeration opening 19 are provided. The pressure channel 18 is connected to the pressure chamber 20. The aeration opening 19 is connected via the pressure channel 18 to the pressure chamber 20. Between the outlet of the pressure circuit 17 in the cover 14 on the one hand and the pressure channel 18 and the aeration opening 19 on the other hand is a cup sleeve 16. If the pressure camber 20 is put under pressure from pressure circuit 17 the compressed air flows past the cup seal 16 and closes off aeration opening 19 in that the cup seal 16 is pressed with one surface against the aeration opening 19. Due to the application of pressure the pressure chamber 20 fills and advantageously stretches the hose diaphragm 2 which is made of cellular rubber until the insides of the hose diaphragm 2 are pressed together and the valve seals off pressure circuit 21. As soon as the pressure in pressure circuit 17 decreases, the pressure on the side of cup seal 16 towards the pressure channel 18 increases, causing said cup seal 16 to open the aeration opening 19 instantly and to close the pressure circuit 17 with its opposite side. The restoring force of the hose diaphragm 2 bringing it into its original position causes the air in the pressure chamber 20 to be pressed through the pressure channel 18 and the aeration opening 19 out of valve 1. The position of the sealing lips of the cup seal 16 in the direction of the pressure channel 18 ensures that on the one hand, when the pressure flows from the pressure circuit 17 into the pressure chamber 20 this compressed air is able to flow past the cup seal 16 into pressure chamber 20. On the other hand, as the pressure is increased on the side of the cup seal 16 towards the pressure chamber 20, said cup seal 16 moves rapidly in direction of lower pressure on the side of the pressure circuit 17 and thereby opens the aeration opening 19 instantly. The small amount of air between cup seal 16 and hose diaphragm 2 ensures that the cup seal 16 will react practically without delay, since the elasticity of air and its friction against the valve walls can be ignored due to the small amount of air and prevailing pressure. Opening times of valve 1 of a few hundredth of a second are possible with such a device. The opening times also remain uniform, with little deviation over many closing and opening cycles and with valves of the same type.

In the device according to FIG. 1 it is advantageous for the control of pressure increase or decrease in the pressure circuit 17 to be locally separated from valve 1. This reduces the size of the valve 1. It can thus be used in the smallest space since it requires hardly any more space than the actual pressure hose 11. Such a valve with a rapid-aeration system is especially advantageous if negative pressure prevails in the pressure circuit 21 In that case the own elasticity and thereby the restoration force of the hose diaphragm 2 is a determinant factor for the rapidity of aeration of the pressure chamber 20. By contrast with overpressure, negative pressure in the pressure circuit 21 does not assist the resetting of the hose diaphragm 2 but rather tends to impede it. It is therefor especially important for the hose diaphragm 2 to possess a great tendency to return into its original form as quickly as possible. On the other hand the hose diaphragm 2 must be sufficiently elastic so that its inside walls press tightly against each other when the pressure chamber 20 is filled and thus totally seal off the pressure circuit 21. Cellular rubber with a hardness of approximately 70 shore has proven to be an especially advantageous material for the hose diaphragm 2. It warrants tight closing and precise opening times even after many closings and openings.

Not only a hose diaphragm valve, but also some other pneumatic valve, e.g. a pneumatic slide valve, can be equipped with the shown rapid-aeration system. In that case the slide valve, for example, is held by a spring force in its open position and is brought by pressure into a closed position. If the pressure is reduced and a pressure chamber is aerated in the manner described above the slide valve is brought back into its open position by the spring force.

Figure 2:
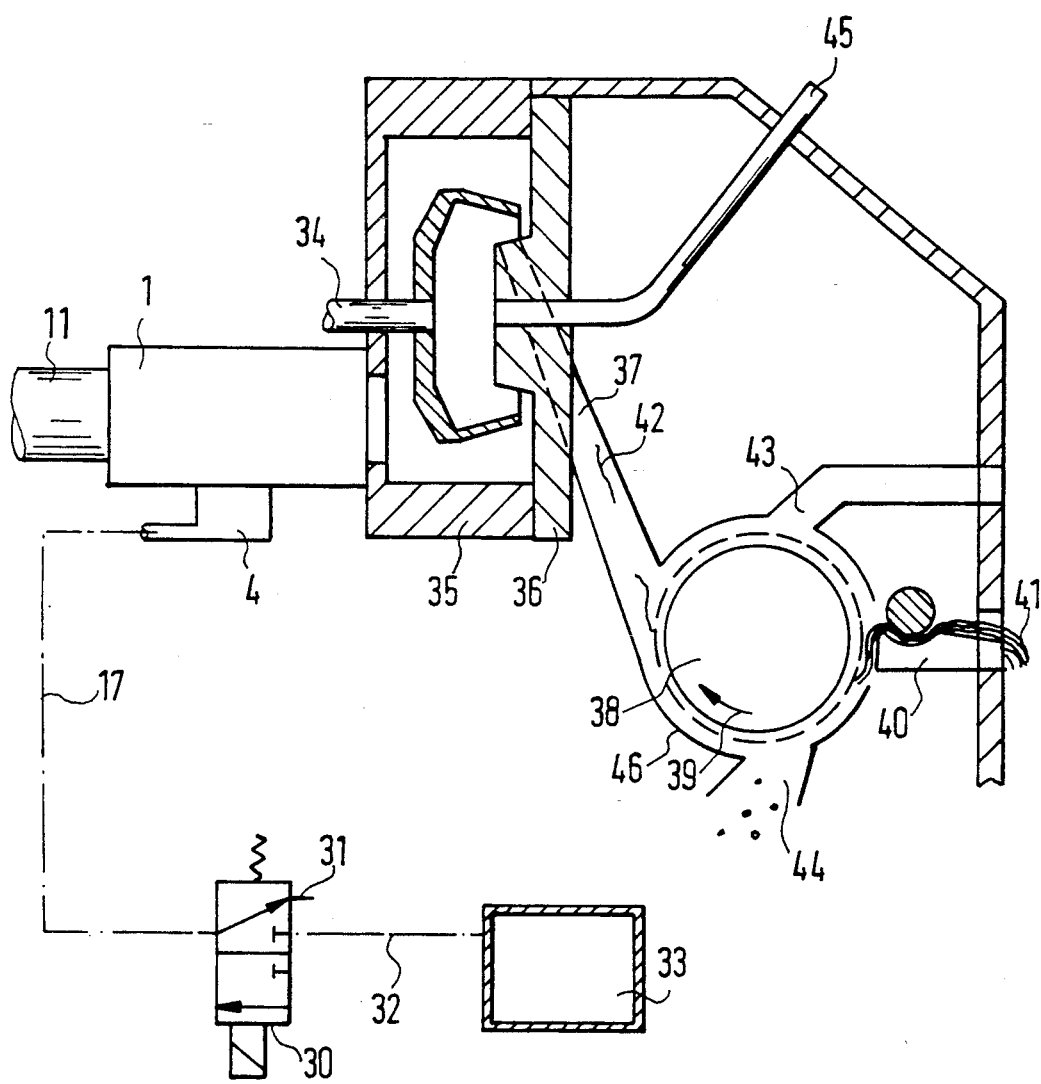
FIG. 2 is a component view of a spinning device according to the invention.

A spinning device, in this case an open-end rotor spinning device with a valve 1 is shown in FIG. 2. A rotor 34 is installed in a rotor housing 35. The rotor housing 35 is covered by a cover 36 in which a fiber feeding channel and a yarn draw-off pipe are provided. Valve 1 together with pressure hose 11 are installed at the back of the rotor housing 35. Negative pressure is produced in the rotor housing 35 via the pressure hose 11 when valve 1 is open. Valve 1 is opened and closed via pressure circuit 17. The pressure circuit 17 is connected via a solenoid valve 30 and a pressure circuit 32 to a closed circuit 33. A plurality of spinning devices are supplied with overpressure through the closed circuit 33. The solenoid valve 30 is switched to aeration 31 in the position shown. This means that no overpressure is taken from the closed circuit 33. The pressure in pressure circuit 17 is atmospheric pressure, so that valve 1 is open. The solenoid valve 30 is switched over, e.g. by a signal emitted by a service unit, causing the passage between the pressure circuit 32 and the pressure circuit 17 to be opened and compressed air to flow from the closed circuit 33 into the pressure circuit 17. This causes the pressure chamber 20 of valve 1 to fill and the pressure circuit 11 to be closed off. Another signal switches solenoid valve 30 back into aeration position so that the pressure in the pressure circuit 17 gradually decreases. Even before the pressure in pressure circuit 17 has dropped completely to atmospheric pressure, the rapid-aeration device 4 of valve 1 causes pressure chamber 20 to empty instantly and valve 1 to open. This causes negative pressure to be produced once more in the rotor housing 35.

Piecing in the open-end spinning machine is effected by feeding a fiber sliver 41 through a feeding device 40 to an opener roller 38. The opener roller 38 rotates in the direction of arrow 39 and thereby detaches individual fibers 42 from the fiber sliver 41. The opener roller 38 is located in an opener roller housing 46. A dirt collection system 44 is located in the opener roller housing 46 in the direction of rotation and after the feeding device 40. This is followed by the fiber feeding channel 37 through which the fibers 42 are fed to the spinning rotor 34 during spinning operation. Following the fiber feeding channel 32 in direction of rotation is a suction opening 43. Suction is applied intermittently through suction opening 43 to the opener roller housing 46 during the piecing process. This ensures that the fibers 42 are not taken through fiber feeding channel 37 but through the suction opening 43 of the opener roller 38. This deflection of the fiber stream however lasts only for as long as the fiber feeding channel 37 is not subjected to suction via rotor housing 35 and pressure hose 11. Valve 1 is therefore generally closed in this state.

For piecing, a yarn end is fed through the yarn draw-off pipe to the spinning rotor 34. For this valve 1 is opened so that the yarn end may be pulled by the negative pressure prevailing in the rotor housing 35. At the same time the fibers 42 are no longer moved away from the opener roller 38 by the negative pressure in the opener roller housing through the suction opening 43 but through the fiber feeding channel 37. The suction applied to the suction opening 43 can then be stopped. As the yarn is again drawn off, the fibers 42 fed to the spinning rotor 34 and the yarn end fed back into the spinning rotor 34 produce a piecing joint. In order to obtain a good and regular piecing joint which remains uniform with each piecing process it is important for the valve 1 to provide full negative pressure in the rotor housing 35 as rapidly as possible and with little time deviations over a number of piecing processes. This is ensured by the described valve 1.

For a uniform piecing joint it is also important for the back-feeding of the yarn end and the application of negative pressure to be synchronized. It is therefore necessary for the response and opening times o valve 1 to remain constant even after a great number of opening and closing cycles.

In the device shown here the suction of the fibers 42 through suction opening 43 must be controlled in such manner that it may not be interrupted before the beginning of suction by the pressure hose 11, as otherwise lap formations may occur on the opening roller 38. If the suction opening 43 is located between the feeding device 40 and the fiber feeding channel 37 in the direction of rotation of the opener roller 38, the opening of valve 1 and the backfeeding of the yarn end into the spinning rotor 34 and the shut-off of suction through suction opening 43 would have to be synchronized in order to bring the fibers 42 into contact with the yarn end at the right moment. In that case the fibers 42 go through the fiber feeding channel 37 only when the suction through suction opening 43 is interrupted.

With a plurality of spinning devices it is advantageous for the solenoid valve 30 or some other, e.g. a mechanical switching device, to be installed in a service unit assigned to several spinning devices. Costs are thus reduced, especially since the switching element is only required when the service unit is used at the pertinent spinning device to produce a yarn piecing joint.

Valve 1 with the rapid-aeration system can not only be used with the open-end rotor spinning device shown but also with other spinning devices such as for example friction spinning devices, air spinning devices or winding devices where negative pressure and/or over pressure must be available at precisely set and reproducible points in time.

It will be apparent to those skilled in the art that various modifications and variations can be made in the apparatus and method of the present invention without departing from the scope or spirit of the invention. Thus, it is intended that the present invention cover the modifications and variations of this invention provided they come within the scope of the appended claims and their equivalents.

We claim:

1. A pressure circuit for controlling the pressure at the spinning surface of textile machine spinning device, comprising:
    a negative pressure source, said negative pressure source in pneumatic communication with the spinning surface;
    a pneumatically actuated diaphragm valve operatively disposed between said negative pressure source and the spinning surface, said diaphragm valve having a normally open position so that during yarn formation a negative pressure is established at the spinning surface;
    pneumatic actuation means in physical communication with said valve and with a source of compressed air for actuating said valve by directing compressed air to said diaphragm valve thereby closing said diaphragm valve;
    a rapid deaeration device in physical communication with said diaphragm valve, said deaeration device defining a vent path from said diaphragm valve for venting compressed air directly from said diaphragm valve thereby allowing said diaphragm valve to rapidly open; and
    a remote control means for actuating said pneumatic actuation means upon the occurrence of a predetermined condition wherein the negative pressure at the spinning surface must be interrupted.

2. The device as in claim 1, wherein said pneumatic actuation means comprises an actuation member physically attached to said valve, said actuation member in communication with said compressed air source.

3. The device as in claim 2, wherein said rapid deaeration device comprises an opening in said actuation member defining a path from said valve to atmosphere.

4. The device as in claim 1, wherein said rapid deaeration device comprises an opening from said valve to atmosphere and said pneumatic actuation means further comprises means for closing off said opening prior to aerating said valve with compressed air.

5. The device as in claim 4, wherein said closing off means comprises a cup seal for rapidly sealing said opening, said cup seal being forced against said opening by the compressed air from said pneumatic actuation means.

6. The device as in claim 1, wherein said diaphragm valve comprises a resilient hose diaphragm stretched between opposite sealing clamping points within said valve, and a compression chamber generally surrounding said hose diaphragm, said compression chamber being in fluid communication with said pneumatic actuation means so that compressed air entering said valve through said actuation means enters aid compression chamber compressing said hose diaphragm together thereby sealing said valve, said rapid deaeration device defining a path from said compression chamber to atmosphere with said actuation means sealing said path during aeration of said valve, whereby upon cessation of aerating said valve, compressed air is vented from said compression chamber through said path allowing said hose diaphragm to return to its initial configuration thereby opening said valve.

7. The device as in claim 6, wherein said pneumatic actuation means comprises an actuation member attached to said valve and in fluid communication with a source of compressed air, said actuation member defining a path therethrough for compressed air to said compression chamber, said rapid deaeration device comprising an opening from said compression chamber through said actuation member to atmosphere, said actuation means further comprising a sealing device for alternately sealing said opening and said path from said source of compressed air.

8. The device as in claim 7, wherein said remote control means comprises a solenoid valve disposed between said actuation member and said source of compressed air.

9. A process for controlling the pressure at a spinning surface of a textile spinning device, said process comprising the steps of:
    disposing a pneumatically controlled diaphragm valve in operative communication between a source of negative pressure and the spinning surface, the valve being actuated by compressed air;
    disposing a valve actuation device in physical communication with the pneumatically controlled diaphragm valve to ensure rapid closing of the valve;

disposing a rapid deaeration device in physical communication with the diaphragm valve to ensure rapid opening of the valve;

connecting the valve actuation device to a source of compressed air;

closing the pneumatically controlled diaphragm valve to the source of negative pressure by aerating a pressure chamber surrounding the diaphragm in the valve with compressed air through the valve actuation device; and opening the pneumatically controlled diaphragm valve by venting the compressed air from the pressure chamber surrounding the diaphragm through the rapid deaeration device.

10. The process as in claim 9, further comprising the step of controlling the flow of compressed air to the valve actuation device with control means remote from the valve actuation device.

11. The process as in claim 10, comprising disposing a solenoid valve between the valve actuation device and source of compressed air for controlling the flow of compressed air.

* * * * *